April 17, 1956 — T. M. COLE — 2,742,548
ACTUATOR FOR HERMETICALLY SEALED MECHANISM
Filed Feb. 7, 1952 — 2 Sheets-Sheet 1
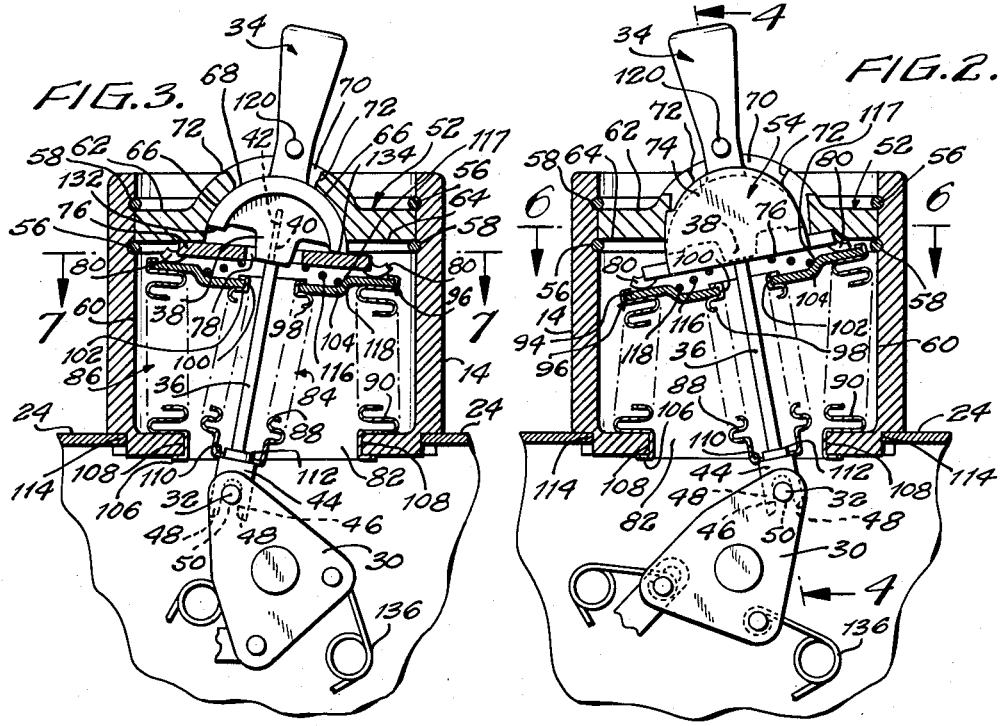
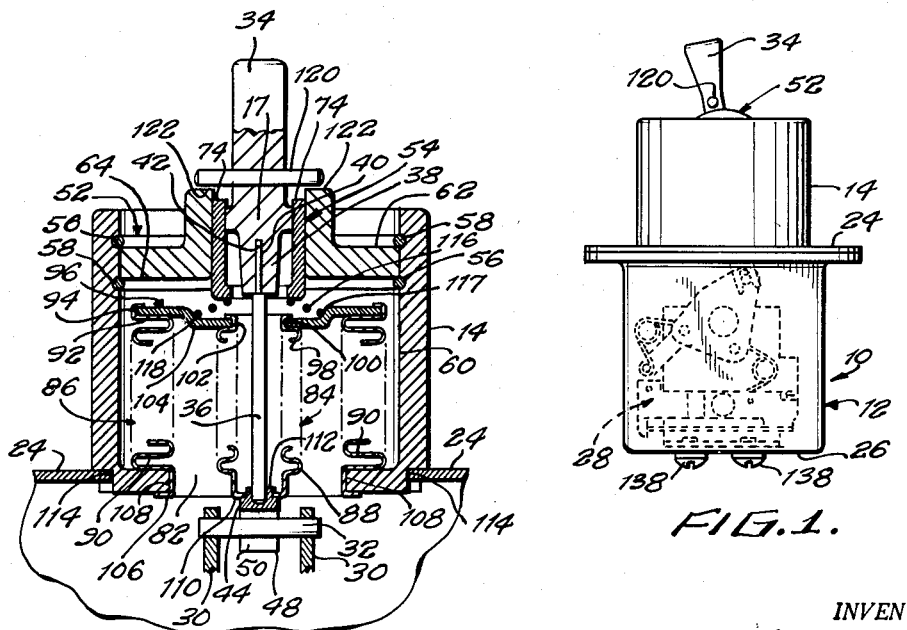
INVENTOR.
THOMAS M. COLE
BY Edwin Leverol & Harry Cole
ATTORNEYS April 17, 1956   T. M. COLE   2,742,548
ACTUATOR FOR HERMETICALLY SEALED MECHANISM
Filed Feb. 7, 1952   2 Sheets-Sheet 2
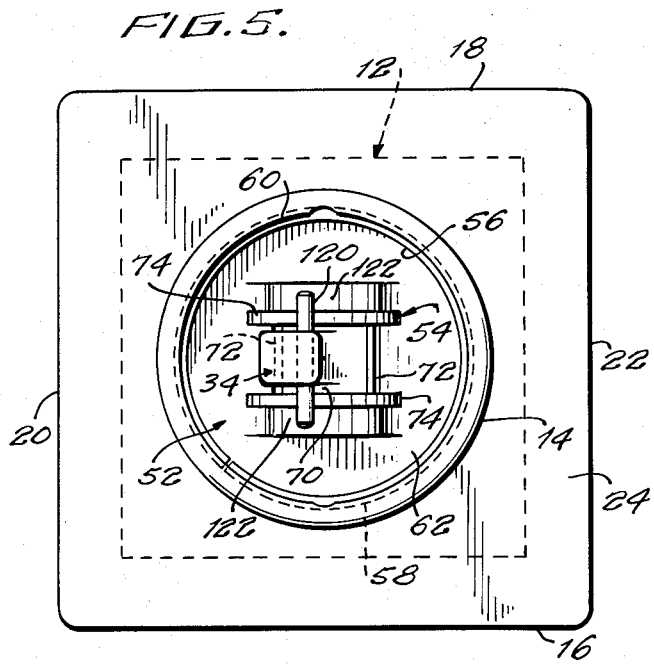
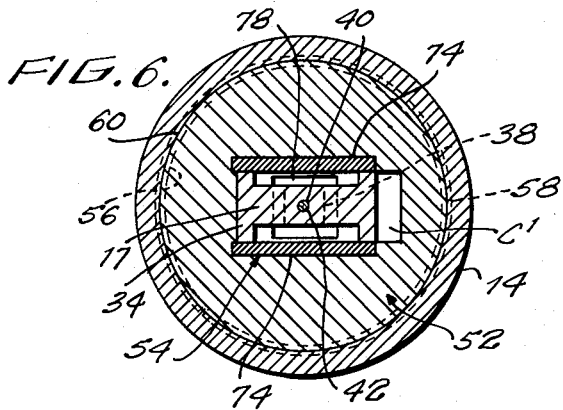
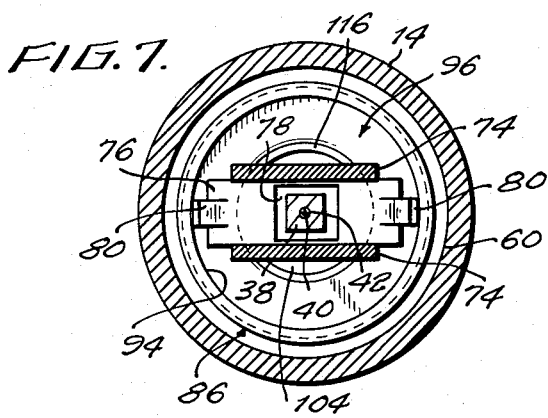
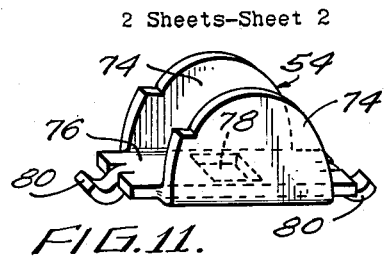
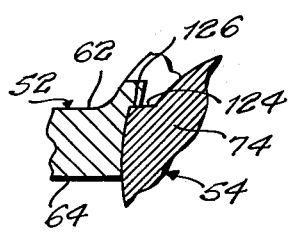
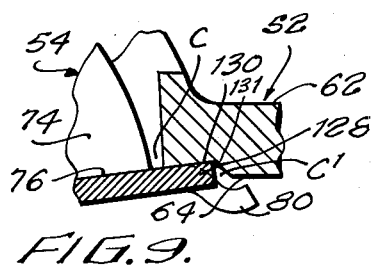
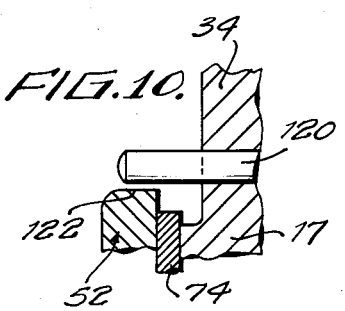
INVENTOR.
THOMAS M. COLE
ATTORNEYS 2,742,548
Patented Apr. 17, 1956

United States Patent Office

2,742,548
ACTUATOR FOR HERMETICALLY SEALED MECHANISM

Thomas M. Cole, New York, N. Y., assignor to Federal Electric Products Company, Newark, N. J., a corporation of Delaware Application February 7, 1952, Serial No. 270,418

20 Claims. (Cl. 200—168)

This invention relates to an actuator for a hermetically sealed mechanism.

One object of the present invention is the provision of an actuator for a hermetically sealed mechanism in which there is provided improved means for hermetically sealing the mechanism.

Another object of the present invention is the provision of an actuator for a hermetically sealed mechanism in which the sealing means is effective to hermetically seal the mechanism in its associated casing without a direct sealing between the relatively movable parts.

Another object of the present invention is the provision of an actuator for a hermetically sealed mechanism disposed in a casing, which actuator at all times reflects the position of the parts of the mechanism in the casing.

The above and other objects, features and advantages of the present invention will be more fully understood from the following description considered in connection with the accompanying illustrative drawings:

In the drawings:

Fig. 1 is a front elevational view of an actuator for a hermetically sealed mechanism according to the present invention;

Fig. 2 is a fragmentary view, on an enlarged scale of the upper portion of Fig. 1, with parts shown in section;

Fig. 3 is a view similar to Fig. 2 showing the actuator parts in another position;

Fig. 4 is a sectional view taken on the line 4—4 of Fig. 2;

Fig. 5 is a top plan view of the actuator for a hermetically sealed mechanism, on an enlarged scale;

Fig. 6 is a sectional view taken on the line 6—6 of Fig. 2;

Fig. 7 is a sectional view taken on the line 7—7 of Fig. 3;

Fig. 8 is a fragmentary view, on an enlarged scale, of a portion of Fig. 2;

Fig. 9 is a fragmentary view, on an enlarged scale, of another portion of Fig. 2;

Fig. 10 is a fragmentary view, on an enlarged scale, of a portion of Fig. 4; and Fig. 11 is a perspective view of the actuator U-frame.

Referring to the drawings, the actuator 10 for a hermetically sealed mechanism comprises a rigid casing 12 having an actuator housing 14, front and rear walls 16 and 18, respectively, side walls 20 and 22, a top wall 24 and a bottom wall 26 which provides a mounting plate for the mechanism 28 disposed in the casing 12. Mechanism 28, positioned in casing 12, is adapted to be hermetically sealed therein and may be any mechanism which is adapted to be operatively associated with the actuator mechanism about to be described. Thus, the mechanism 28 positioned and hermetically sealed in casing 12 may be any circuit breaker, for example a circuit breaker of the general type illustrated and described in my co-pending application Serial No. 234,303 filed June 29, 1951, and assigned to the assignee of the present application. Thus mechanism 28, which may be a circuit breaker, is provided with a pair of spaced yokes 30, 30 having a shaft 32 transversely extending therebetween and secured to said yokes in any conventional manner. It will be readily apparent that the movement of shaft 32 and its associated yokes 30 will be effective to operatively move and control the circuit breaker 28 whereby the actuation of shaft 32 will be effective to correspondingly actuate its associated circuit breaker.

The actuating mechanism about to be described is preferably positioned in a housing 14 of casing 12 and comprises an operating handle 34, mounted externally of said casing, and a lever rod 36 which are secured to each other. More particularly, handle 34 is provided with a projecting portion 38 which is suitably apertured at 40 for the reception of reduced portion 42 of rod 36, said reduced portion being preferably press-fitted in handle 34. At the lower end of the lever rod 36 there is secured a fitting 44 which has a forked end 46 comprising spaced legs 48 defining an opening 50 therebetween. The shaft 32 is adapted to be received in opening 50 in the assembled condition of the actuator and mechanism 28 whereby the movement of the operating handle 34 will be effective to concomitantly move yokes 30, 30 associated with the circuit breaker mechanism 28. Thus the means for actuating the mechanism 28 has a part disposed externally of casing 12 in the form of an operating handle 34 and a part disposed internally of the casing in the form of fitting 44 and its associated actuator structure.

Handle 34 is retained in position relative to housing 14 by means of the cover plate 52 and the U-frame 54. Plate 52 is secured in housing 14 by means of the split retainer rings 56 which are received in complementary peripherally extending grooves 58 in the inner surface 60 of said housing. Thus the retainer rings 56 cooperate with the upper and lower surfaces 62 and 64, respectively, of plate 52 to position and secure the latter in the housing 14. Plate 52 is provided with arcuate surfaces 66 which are adapted to cooperate with the outer arcuate surface 68 of handle 34 whereby to guide the latter for its range of pivotal movement. Plate 52 is provided with an elongated aperture at 70 whereby handle 34 may be pivoted relative to plate 52 with abutments 72 of plate 52 constituting limit means defining the extreme limits of pivotal movement of the operating handle 34.

With reference to Fig. 11 frame 54 comprises a pair of spaced upstanding legs 74 connected by plate 76. The lower portion 17 of the operating handle 34 is adapted to be received between the spaced legs 74 of frame 54 but is not secured thereto. Plate 76 is centrally apertured at 78 complementary to portion 38 of handle 34. The frame 54 is further provided with a depending or struck-down portion 80 at each end of plate 76, said depending portions 80 being adapted to cooperate with structure about to be described.

The operating handle 34, which is disposed externally of the casing 12, is operatively connected to the circuit breaker 28, disposed internally of said casing, by means of lever rod 36 which extends through aperture 82 of said casing. In order to provide a fluid-tight or hermetic seal for the circuit breaker 28 disposed in casing 12 there is provided flexibly movable sealing means comprising a pair of coaxially arranged resiliently flexible bellows 84 and 86 which are effective to prevent the passage of fluid into or out of casing 12 through the opening 82. Bellows 84 is disposed internally of bellows 86 and said bellows 84 and 86 comprise a length of flexible resilient seamless corrugated tubing of the open pitch type 88 and 90, respectively. The end portion 92 of bellows 86 is secured to the outer peripheral marginal edge portion 94 of the centrally apertured annular plate 96 and the end portion 98 of bellows 84 is secured to the inner peripheral marginal edge portion 100 of said annular plate 96 whereby the flexible bellows 84 and 86 are connected to each other at one of their ends. It will be noted that the annular plate 96 is centrally apertured at 102 and has a depressed central annular portion 104 which is adapted for a purpose to be described hereinafter. The end portion 106 of bellows 86 is secured to the annular shoulder 108 of the housing 14 in fluid sealing relation therewith. Thus the lower end portion 106 of the bellows 86 is secured to the casing 12 in fluid-tight relation to form a fluid-tight seal therewith. The end portion 110 of bellows 84 is secured to the lower end of lever rod 36 in fluid-sealing relation therewith. More particularly, the fitting 44, which is secured to the rod 36, is provided with a portion of reduced diameter 112 which is secured to the end portion 110 of bellows 84 in any suitable manner to provide a fluid-tight seal therewith. Thus the end portion 110 of bellows 84 is secured to the rod 36 and associated structure in fluid-tight relation to form a fluid-tight seal therewith.

It will be apparent from the above that the coaxially arranged bellows 84 and 86 provides a fluid-tight seal for the actuating mechanism 28 disposed internally of casing 12, said bellows preventing the passage of fluid into or out of the casing 12 through the opening or aperture 82. The end portions 92 and 98 of bellows 86 and 84, respectively, are in fluid-sealing relation with plate 96 and similarly the end portions 106 ad 110 of said bellows 86 and 84, respectively, are in fluid-sealing relation with the housing 14 and fitting 44 of rod 36, respectively, said seal, being effected in any conventional manner, for example by silver soldering, brazing and the like. Thus bellows 84 and 86, in association with the annular plate 96 and lever rod 36, are effective to hermetically seal any mechanism 28 that may be disposed in casing 12 with the mechanism being actuated by the handle 34 disposed externally of the casing. The housing 14, if desired, may be formed as a separate part and secured to the top wall 24 of casing 12 in any well known conventional manner as indicated at 114. It will be understood that the housing 14 and casing 12 are each of preferably integral construction whereby their securement at 114 will be effective to hermetically seal the mechanism 28 in conjunction with the aforedescribed flexible resilient bellows.

Positioned between the plate 76 of U-frame 54 and the depressed portion 104 of plate 96 is a tapered coil spring 116 which is effective to urge the separation of said U-frame and said plate. Thus spring 116 has one end 117 positioned in abutting relation with shoulder 118 of plate 96 and has its other end in abutting relation with adjacent portions of the under side of plate 76 of U-frame 54. It will be readily apparent therefore that compression spring 116 will be effective to urge the U-frame 54 in an axial outward direction whereby the handle 34 will be urged in a direction outwardly of casing 12 against adjacent portions 66 of plate 52. Thus the tapered spring 116 is effective to spring-urge handle 34 against the plate 52 to properly position said handle. In order to prevent the handle 34 from being manually depressed inwardly of the housing 14, there is provided a transversely extending stop pin 120 which is secured to, and extends through, handle 34 and is normally spaced above associated portions 122 of plate 52. It will be evident from the above that handle 34 will be restrained from being excessively depressed inwardly of casing 12 by means of the stop pin 120 whereby to prevent any possible damage to the mechanism disposed internally of the housing 14 and casing 12 that may result by such excessive depression of handle 34.

As aforedescribed, plate 76 of frame member 54 is provided with spaced depending portions 80 and said latter portions are adapted to abut and coact with adjacent portions of annular plate 96, as best shown in Figs. 2 and 3. It will be readily apparent therefore that the movement of U-frame 54 will be effective to concomitantly move plate 96, the movement of the latter plate imparting its motion to its associated bellows 84 and 86. Handle 34 is adapted to be manually reciprocated between an "on" position, as shown in Fig. 2, and an "off" position shown in Fig. 3, and said movement of the operating handle 34 will correspondingly move yokes 30, 30 to control its associated mechanism 28 disposed internally of casing 12.

With reference to Figs. 2 and 8, it will be noted that the U-frame 54 is provided with a shoulder 124 at one side which is adapted to coact with a complementary shoulder 126 formed integral with plate 52. Thus in the "on" position of handle 34, the shoulder 124 of U-frame 54 will interlock with shoulder 126 of plate 52 whereby handle 34 will be latched in an "on" position which will require a deliberate manual force for its release. Similarly in the "on" position of the operating handle 34, an outer edge portion 128 of U-frame 54 will interengage and abut the shoulder 130 formed integral with plate 52. Thus in the "on" position of the actuating handle 34 the portions 124 and 128 of the U-frame 54 will coact with associated portions of the plate 52 to latch said operating handle in an "on" position, it being noted that the spring 116 is at all times urging said U-frame outwardly of the casing 12. By a deliberate manual force the handle 34 may be readily released from its "on" position and reciprocated to its "off" position shown in Fig. 3. In the "on" position of the handle 34 there is provided clearance C and C' between the U-frame 54 and the plate 52 so that on the initial movement of the handle 34 in an "off" direction said handle will be transversely bodily moved a sufficient amount whereby to unlatch the shoulder portion 124 of said U-frame from shoulder 126 of plate 52. Thus clearance C and C' permits sufficient transverse movement of the handle 34 to perform said unlatching operation whereby the handle 34 may be manually reciprocated or rotated to the "off" position. The movement of handle 34 in an "off" direction will thus result in a small degree of initial transverse movement and thereafter said handle will move in a rotary direction until the full "off" position is reached.

On initial movement of handle 34, the lower edge portion 132 of the handle 34 will be brought in abutting relation with associated portions of the U-frame 54 and thereafter the further movement of said handle will be effective to concomitantly move said U-frame, the depending portions 80 of the latter being effective to concomitantly move annular plate 96 and the bellows 84 and 86 associated therewith. Similarly, on the initial movement of the operating handle 34 from the "on" to the "off" position, the lower edge portion 134 of said operating handle will be brought in abutting relation with adjacent portions of the U-frame 54, and on the further movement of said handle the depending portion 80 of the frame will be effective to concomitantly move the annular plate 96 and the pair of bellows 84 and 86 associated therewith. Thus the manual actuation of the operating handle 34 will be effective to correspondingly move the U-frame 54, plate 96 and its associated pair of bellows 84 and 86.

The bellows 84 is structurally weaker than bellows 86 whereby the latter bellows may be subjected to a greater amplitude and frequency of reversals of stress and strain without rupturing. Due to the above described construction bellows 84 will have its walls 88 flexed a smaller amount relative to the walls 90 of bellows 86 in the movement of the actuating handle 34 between its "on" and "off" positions. Thus the bellows 84, which is structurally a weaker bellows, will have its walls 88 flexed a relatively small amount thereby to minimize the danger of rupturing. Conversely the bellows 86 will have its walls 90 flexed a relatively greater amount in the movement of the actuating handle 34 between its extreme positions, said movement having no adverse effects on bellows 86 due to its inherently stronger wall structure 90.

In the "off" position of the handle 34, a spring 136 of the circuit breaker 28 will be effective to urge the operating handle 34 to remain in such position whereby a deliberate movement of said handle is required to move the latter from an "off" to an "on" position. It will be understood that the circuit breaker 28 will have associated therewith electro-responsive trip means for opening said circuit breaker and the opening of said circuit breaker will be effective to move the lever rod 36 and its associated mechanism to the circuit open or "off" position, whereby the handle 34 will be correspondingly moved to the "off" position. The circuit breaker 28 is also provided with terminals 138 extending outwardly of the bottom wall 26 of casing 12 for electrical connection into an associated circuit to be controlled. Although in the preferred embodiment bellows 84 and 86 are utilized to hermetically seal the mechanism 28 in casing 12 it will be understood that any resilient flexible means may be utilized to hermetically seal said mechanism. Similarly, although the bellows 84 and 86 aforedescribed are preferably of metallic construction it will be understood that such bellows may be formed of materials of other than metal.

It will be seen from the above that the above described sealing means is effective to hermetically seal any mechanism 28 disposed in casing 12 without any direct sealing between the relatively moving parts of the actuator, namely the operating handle 34, the lever rod 36 and its associated casing structure. As indicated above, the operating handle 34 at all times reflects the position of the parts of mechanism 28 disposed in the casing. It will be understood that any predetermined range of movement of the operating handle 34 may be had as desired, and further mechanism 28 disposed in casing 12 may be such as to require distinct intermediate positions of handle 34 between the extreme limits of pivotal movement, in which case said handle will have corresponding intermediate positions.

With reference to Fig. 9, it will be noted that shoulder 130 of plate 52 is provided with an inclined portion 131 which is adapted to coact with edge portion 128 of frame 54. In the "on" position of handle 34 portion 131 will aid the maintenance of handle 34 in said position as a deliberate force will be necessary to transversely move portion 128 onto the inclined portion 131 to release handle 34 from the "on" position. When handle 34 is moved from the "on" to the "off" position the initial movement of said handle will cause portion 128 to ride up the inclined portion 131 to release said handle from the "on" position in the aforedescribed manner.

It is also to be understood that casing 12 and housing 14 are hermetically sealed at 114 and that terminals 138 are hermetically sealed relative to the casing 12 whereby to hermetically seal mechanism 28 in said casing.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuation means at spaced points, said flexible means having a fluid-tight connection with said casing and with said internally disposed actuating means.

2. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuating means at spaced points, said casing having an opening through which said operative connection of said external actuating means to said internal actuating means is provided, said flexible means having a fluid-tight seal with said internally disposed actuating means and with said casing at said opening whereby to prevent the passage of fluid into or out of the casing through said opening.

3. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuating means of spaced points, said flexible means having a fluid-tight connection with said casing and with said internally disposed actuating means, said flexible means comprising a resiliently flexible bellows operatively connected to said internally disposed actuating means and to said casing and having a fluid-tight seal with said casing and with said internally disposed actuating means.

4. In a casing-enclosed circuit breaker mechanism provided with means disposed externally of the casing for actuating said mechanism, actuating means disposed internally of said casing and operatively connected to said mechanism, and flexible means operatively connected with said externally disposed means and said internally disposed actuating means, said flexible means having a fluid-tight connection with said casing and with said internally disposed actuating means, said externally disposed actuating means comprising a handle for manually operating said circuit breaker, said circuit breaker having electro-responsive trip means for opening the circuit breaker, means operable in response to the opening of the circuit breaker by said trip means to move said internally disposed actuating means to a predetermined position, said internally disposed actuating means being operative through said connection thereof with said externally disposed actuating means to move said handle automatically to a position corresponding to said tripped-open condition of the circuit breaker.

5. In a casing-enclosed circuit breaker mechanism provided with means disposed externally of the casing for actuating said mechanism, actuating means disposed internally of said casing and operatively connected to said mechanism, and flexible means operatively connected with said externally disposed means and said internally disposed actuating means, said flexible means having a fluid-tight connection with said casing and with said internally disposed actuating means, said externally disposed actuating means comprising a handle for manually operating said circuit breaker, said circuit breaker having electro-responsive trip means for opening the circuit breaker, means operable in response to the opening of the circuit breaker to move said internally disposed actuating means to a predetermined position, said internally disposed actuating means being operative through said connection thereof with said externally disposed actuating means to move said handle to a position corresponding to said tripped-open condition of the circuit breaker, said flexible connecting and sealing means comprising a resiliently flexible bellows sealed to said casing at one end and operatively connected at its other end to said internally disposed actuating means in fluid-tight relation therewith, said last mentioned connection comprising a second resiliently flexible bellows disposed internally of said first mentioned bellows and having a fluid-tight connection at one end thereof with said internally disposed actuating means and at its other end with said first mentioned bellows.

6. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuating means, said flexible means having a fluid-tight connection with said casing and with said internally disposed actuating means, said flexible connecting and sealing means comprising a resiliently flexible bellows sealed to said casing at one end and operatively connected at its other end to said internally disposed actuating means in fluid-tight relation therewith, said last mentioned connection comprising a second resiliently flexible bellows disposed internally of said first mentioned bellows and having a fluid-tight connection at one end thereof with said internally disposed actuating means and at its other end with said first mentioned bellows.

7. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuating means, said casing having an opening through which said operative connection of said external actuating means to said internal actuating means is provided, said flexible means having a fluid-tight seal with said internally disposed actuating means and with said casing at said opening whereby to prevent the passage of fluid into or out of the casing through said opening, said flexible means comprising a plurality of co-axially arranged resiliently flexible bellows connected to each other at one of their ends, the other end of one of said bellows being secured to said casing in fluid-tight relation to form said fluid-tight seal therewith and the other end of another of said bellows being secured to said internally disposed actuating means in fluid-tight relation to form said fluid-tight seal therewith.

8. In a casing-enclosed circuit breaker mechanism provided with means disposed externally of the casing for actuating said mechanism, actuating means disposed internally of said casing and operatively connected to said mechanism, and flexible means operatively connected with said externally disposed means and said internally disposed actuating means, said flexible means having a fluid-tight connection with said casing and with said internally disposed actuating means, said externally disposed actuating means comprising a handle for manually operating said circuit breaker, said circuit breaker having electro-responsive trip means for opening the circuit breaker, means operable in response to the opening of the circuit breaker to move said internally disposed actuating means to a predetermined position, said internally disposed actuating means being operative through said connection thereof with said externally disposed actuating means to move said handle to a position corresponding to said tripped-open condition of the circuit breaker, said flexible means comprising a plurality of co-axially arranged resiliently flexible bellows connected to each other at one of their ends, the other end of one of said bellows being secured to said casing in fluid-tight relation to form said fluid-tight seal therewith and the other end of another of said bellows being secured to said internally disposed actuating means in fluid-tight relation to form said fluid-tight seal therewith.

9. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuating means at spaced points, said flexible means comprising a resiliently flexible bellows operatively connected to said internally disposed actuating means and to said casing and having a fluid-tight seal with said casing and with said internally disposed actuating means, said means disposed externally of the casing being adapted to be moved between a first and a second position, and means for restraining said last mentioned means in said first and second positions whereby a deliberate manual force will be required to move said external means from said first and second positions.

10. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuating means, said flexible means comprising resiliently flexible bellows operatively connected to said internally disposed actuating means and to said casing and having a fluid-tight seal with said casing and with said internally disposed actuating means, said externally disposed means being positioned in a frame, said frame having portions thereof operatively associated with said bellows whereby the movement of said last mentioned means will concomitantly move said portions with the latter being effective to correspondingly move said bellows.

11. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuating means, said flexible means comprising a resiliently flexible bellows operatively connected to said internally disposed actuating means and to said casing and having a fluid-tight seal with said casing and with said internally disposed actuating means, said externally disposed means being positioned in a U-shaped frame, said frame having a pair of spaced depending portions operatively associated with adjacent upper end portions of said bellows whereby the movement of said last mentioned means will concomitantly move said depending portions with the latter being effective to correspondingly move said bellows.

12. In a casing-enclosed mechanism provided with means disposed externally of the casing for actuating said mechanism, actuating means disposed internally of said casing and operatively connected to said mechanism, and flexible means independently operatively connected with said externally disposed means and said internally disposed actuating means at spaced points, said flexible means comprising a resiliently flexible bellows operatively connected to said internally disposed actuating means and to said casing and having a fluid-tight seal with said casing and with said internally disposed actuating means, and means interposed between said externally disposed means and said flexible means, said means being effective to operatively connect said externally disposed means and said flexible means.

13. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuating means at spaced points, said flexible means comprising a resiliently flexible bellows operatively connected to said internally disposed actuating means and to said casing and having a fluid-tight seal with said casing and with said internally disposed actuating means, means interposed between said externally disposed means and said flexible means, said means being effective to operatively connect said externally disposed means and said flexible means, and resilient means positioned between said interposed means and said flexible means, said resilient means being effective to urge the separation of said interposed means and said flexible means.

14. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuating means, said casing having an opening through which said operative connection of said external actuating means to said internal actuating means is provided, said flexible means having a fluid-tight seal with said internally disposed actuating means and with said casing at said opening whereby to prevent the passage of fluid into or out of the casing through said opening, said flexible means comprising a plurality of co-axially arranged resiliently flexible bellows connected to each other at one of their ends, the other end of one of said bellows being secured to said casing in fluid-tight relation to form said fluid-tight seal therewith and the other end of another of said bellows being secured to said internally disposed actuating means in fluid-tight relation to form said fluid-tight seal therewith, and means interposed between said externally disposed means, and said connected one end of said plurality of bellows, said means being effective to operatively connect said externally disposed means and said plurality of bellows, and a compression spring positioned between said interposed means and said one end of said plurality of bellows, said spring being effective to urge the separation of said interposed means and said plurality of bellows.

15. In a casing-enclosed mechanism provided with means disposed externally of the casing for actuating said mechanism, actuating means disposed internally of said casing and operatively connected to said mechanism, and flexible means operatively connected with said externally disposed means and said internally disposed actuating means, said casing having an opening through which said operative connection of said external actuating means to said internal actuating means is provided, said flexible means having a fluid-tight seal with said internally disposed actuating means and with said casing at said opening whereby to prevent the passage of fluid into or out of the casing through said opening, said flexible means comprising a plurality of co-axially arranged resiliently flexible bellows connected to each other at one of their ends, the other end of one of said bellows being secured to said casing in fluid-tight relation to form said fluid-tight seal therewith and the other end of another of said bellows being secured to said internally disposed actuating means in fluid-tight relation to form said fluid-tight seal therewith, and means interposed between said externally disposed means and said connected one end of said plurality of bellows, said means being effective to operatively connect said externally disposed means and said plurality of bellows, and a compression spring positioned between said interposed means and said one end of said plurality of bellows, said spring being effective to urge the separation of said interposed means and said plurality of bellows, said interposed means comprising a frame member having a pair of spaced depending portions operatively associated with adjacent portions of said connected one end of said plurality of bellows.

16. In a casing-enclosed circuit breaker mechanism provided with means disposed externally of the casing for actuating said mechanism, actuating means disposed internally of said casing and operatively connected to said mechanism, and flexible means operatively connected with said externally disposed means and said internally disposed actuating means at spaced points, said flexible means having a fluid-tight connection with said casing and with said internally disposed actuating means, said externally disposed actuating means comprising a handle for manually operating said circuit breaker, said circuit breaker having electro-responsive trip means for opening the circuit breaker, means operable in response to the opening of the circuit breaker by said trip means to move said internally disposed actuating means to a predetermined position, said internally disposed actuating means being operative through said connection thereof with said externally disposed actuating means to move said handle automatically to a position corresponding to said tripped-open condition of the circuit breaker, said flexible means comprising a cylindrical bellows.

17. In a casing-enclosed circuit breaker mechanism provided with means disposed externally of the casing for actuating said mechanism, actuating means disposed internally of said casing and operatively connected to said mechanism, and flexible means operatively connected with said externally disposed means and said internally disposed actuating means at spaced points, said flexible means having a fluid-tight connection with said casing and with said internally disposed actuating means, said externally disposed actuating means comprising a handle for manually operating said circuit breaker, said circuit breaker having electro-responsive trip means for opening the circuit breaker, means operable in response to the opening of the circuit breaker by said trip means to move said internally disposed actuating means to a predetermined position, said internally disposed actuating means being operative through said connection thereof with said externally disposed actuating means to move said handle automatically to a position corresponding to said tripped-open condition of the circuit breaker, and means operatively connected to said handle and to said flexible means for providing positive resistance to the movement of said handle from said tripped-indicating position thereof.

18. In a casing-enclosed circuit breaker mechanism provided with means disposed externally of the casing for actuating said mechanism, actuating means disposed internally of said casing and operatively connected to said mechanism, and flexible means operatively connected with said externally disposed means and said internally disposed actuating means at spaced points, said flexible means having a fluid-tight connection with said casing and with said internally disposed actuating means, said externally disposed actuating means comprising a handle for manually operating said circuit breaker, said circuit breaker having electro-responsive trip means for opening the circuit breaker, means operable in response to the opening of the circuit breaker by said trip means to move said internally disposed actuating means to a predetermined position, said internally disposed actuating means being operative through said connection thereof with said externally disposed actuating means to move said handle automatically to a position corresponding to said tripped-open condition of the circuit breaker, said flexible means comprising a cylindrical bellows, and means operatively connected to said handle providing a releasable connection to releasably latch said handle stationary in the positions in which the circuit breaker is closed and open, respectively.

19. In a casing-enclosed mechanism provided with means disposed externally of the casing for actuating said mechanism, actuating means disposed internally of said casing and operatively connected to said mechanism, said casing having an opening through which said operative connection of said external actuating means to said internal actuating means is provided, and flexible means for preventing passage of fluid into and out of said casing through said opening, said flexible means comprising a pair of coaxially arranged resiliently flexible bellows, each of said bellows being operatively connected at one end thereof to said external actuating means in fluid tight relation therewith, one of said bellows being secured at its other end to said casing in fluid tight relation therewith, the other of said bellows being secured at its other end to said internally disposed actuating means in fluid tight relation therewith.

20. In a casing-enclosed mechanism provided with means disposed externally of the casing for actuating said mechanism, actuating means disposed internally of said casing and operatively connected to said mechanism, said casing having an opening through which said operative connection of said external actuating means to said internal actuating means is provided, and flexible means for preventing passage of fluid into and out of said casing through said opening, said flexible means comprising a pair of coaxially arranged resiliently flexible bellows, said pair of bellows being operatively connected to each other in fluid tight relation at one end, one of said bellows being secured at its other end to said casing in fluid tight relation therewith, the other of said bellows being secured at its other end to said internally disposed actuating means in fluid tight relation therewith.

References Cited in the file of this patent

UNITED STATES PATENTS

| | | |
|---|---|---|
| 1,916,717 | De Geirs | July 4, 1933 |
| 2,419,180 | Unger | Apr. 15, 1947 |
| 2,527,475 | Bates | Oct. 24, 1950 |

FOREIGN PATENTS

| | | |
|---|---|---|
| 559,923 | Great Britain | Mar. 10, 1944 |